US008886475B2

(12) United States Patent
Frei et al.

(10) Patent No.: US 8,886,475 B2
(45) Date of Patent: Nov. 11, 2014

(54) RELIABILITY CALCULATION FOR SUBSTATION AUTOMATION SYSTEMS

(75) Inventors: Christian Frei, Untersiggenthal (CH); Jean-Charles Tournier, Bellegarde sur Valserine (FR); Thomas Werner, Baden (CH); Wolfgang Wimmer, Rietheim (CH)

(73) Assignee: ABB Research Ltd, Zürich (CH)

( * ) Notice: Subject to any disclaimer, the term of this patent is extended or adjusted under 35 U.S.C. 154(b) by 379 days.

(21) Appl. No.: 13/429,917

(22) Filed: Mar. 26, 2012

(65) Prior Publication Data

US 2012/0239320 A1 Sep. 20, 2012

Related U.S. Application Data

(63) Continuation of application No. PCT/EP2010/063363, filed on Sep. 13, 2010.

(30) Foreign Application Priority Data

Sep. 25, 2009 (EP) .................................. 09171343

(51) Int. Cl.
*G01R 31/00* (2006.01)
*H04L 12/24* (2006.01)
*G05B 23/02* (2006.01)
*H04L 12/26* (2006.01)

(52) U.S. Cl.
CPC ........... *G05B 23/0248* (2013.01); *Y04S 40/164* (2013.01); *H04L 41/5012* (2013.01); *H04L 41/12* (2013.01); *H04L 43/0805* (2013.01); *Y04S 40/168* (2013.01)
USPC .......................................................... 702/58

(58) Field of Classification Search
USPC ................. 702/58, 60–64, 182–185
See application file for complete search history.

(56) References Cited

U.S. PATENT DOCUMENTS

2009/0070051 A1 3/2009 Vetter et al.

FOREIGN PATENT DOCUMENTS

EP 1850109 A1 10/2007
WO WO 99/14877 A1 3/1999

OTHER PUBLICATIONS

International Search Report (PCT/ISA/210) issued on Jan. 12, 2011, by European Patent Office as the International Searching Authority for International Application No. PCT/EP2010/063363.
International Preliminary Report on Patentability (PCT/IPEA/409) issued on Dec. 1, 2011, by European Patent Office as the International Examining Authority for International Application No. PCT/EP2010/063363.
European Search Report issued Feb. 4, 2010 for European Application No. 09171343.8.

(Continued)

Primary Examiner — Edward Raymond
(74) Attorney, Agent, or Firm — Buchanan Ingersoll & Rooney PC

(57) ABSTRACT

A method and device automatically extract, to a maximum extent, reliability-relevant information from a Substation Configuration Description (SCD) file describing an electric power transmission or distribution substation. The information in the SCD file is used to identify the physical topology of a communication network of a Substation Automation (SA) system, and all dataflow relating to a given SA functionality or Logical Node (LN). An LN reliability measure for the latter is calculated, involving reliability indications specific to each element or device participating in the dataflow. A number of LN reliability measures are consolidated to produce an overall reliability for the SA system architecture or communication network topology. The method and tool minimize the engineering effort required to perform a reliability calculation, and thus allow comparing the reliability of different SA architectures with minimal effort and intervention of a reliability engineer.

11 Claims, 3 Drawing Sheets

(56) References Cited

OTHER PUBLICATIONS

B. Yunus et al., Reliability and Availability Study on Substation Automation System based on IEC 61850, 2nd IEEE International Conference on Power and Energy (PECon 08), Dec. 1-3, 2008, Johor Baharu, Malaysia.

Lars Andersson et al., Reliability investigations for SA communication architectures based on IEC 61850, Presented as Paper 604 in the Poster Session at 2005 IEEE St. Petersburg PowerTech, Jun. 27-30, 2005, St. Petersburg, Russia.

Jiping Lu, et al., State enumeration technique combined with a labeling bus set approach for reliability evaluation of substation configuration in power systems, Electric Power Systems Research 77 (2007), pp. 401-406.

Fig. 1
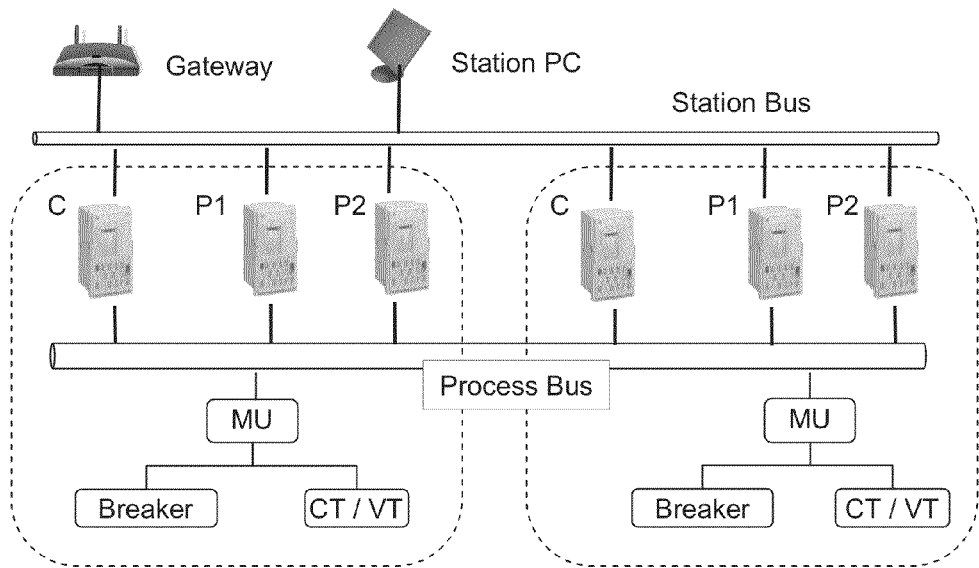
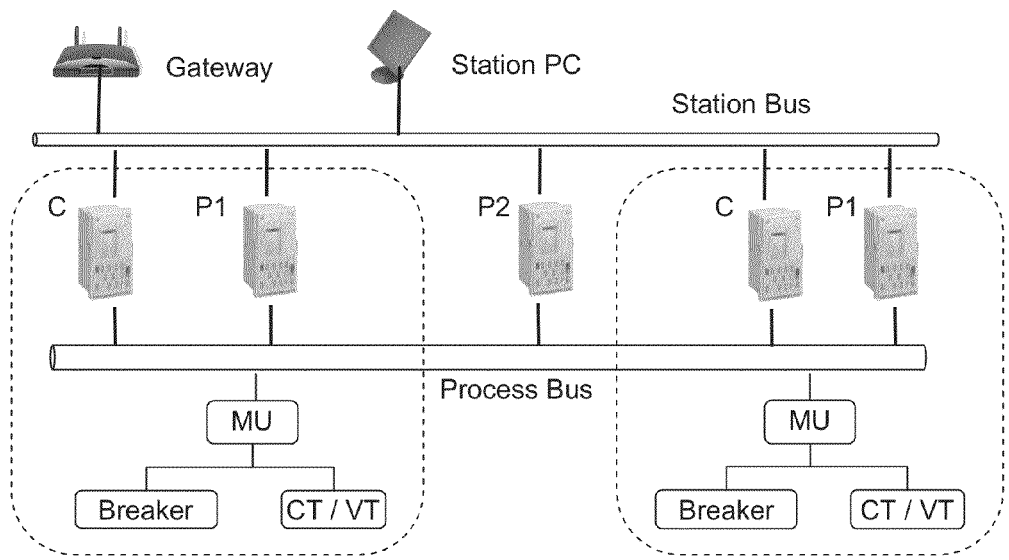

Fig. 2

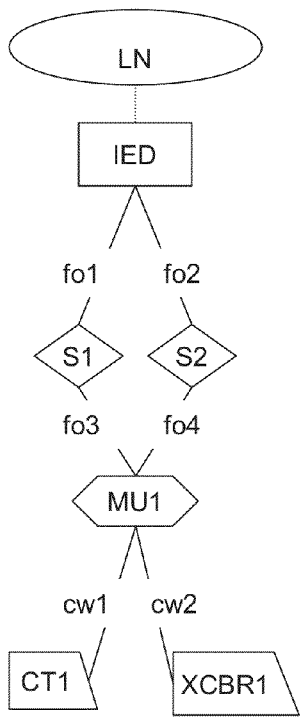

Fig. 5

```
<ConnectedAP iedName="P2KA1" apName="S1">
  <Address>
   <P type="IP">10.41.24.75</P>
   …………..
  </Address>
  <GSE ldInst="C1" cbName="Interlock">
   <Address>
    <P type="MAC-Address">01-0C-CD-01-00-01</P>
    <P type="APPID">3001</P>
    <P type="VLAN-PRIORITY">4</P>
    <P type="VLAN-ID">004</P>
   </Address>
   <MinTime unit="s">4</MinTime>
   <MaxTime unit="s">10000</MaxTime>
  </GSE>
  <PhysConn type="Connection">
   <P type="Cable">C1</P>
   <P type="Port">P1</P>
  </PhysConn>
</ConnectedAP>

<ConnectedAP iedName="SW1" apName="S1">
  <Address>
   <P type="IP">10.41.24.105</P>
   …………..
  </Address>
  <PhysConn type="Connection">
   <P type="Cable">C1</P>
   <P type="Port">P5</P>
  </PhysConn>
</ConnectedAP>
```

RELIABILITY CALCULATION FOR SUBSTATION AUTOMATION SYSTEMS

RELATED APPLICATIONS

This application claims priority as a continuation application under 35 U.S.C. §120 to PCT/EP2010/063363, which was filed as an International Application on Sep. 13, 2010 designating the U.S., and which claims priority to European Application 09171343.8 filed in Europe on Sep. 25, 2009. The entire contents of these applications are hereby incorporated by reference in their entireties.

FIELD

The present disclosure relates to Substation Automation (SA) systems with a standardized configuration representation, and more particularly to, an evaluation of their reliability.

BACKGROUND INFORMATION

Substations in high and medium-voltage electric power networks include primary devices such as electrical cables, lines, bus bars, switches, power transformers and instrument transformers, which can be arranged in switch yards and/or bays. These primary devices are operated in an automated way via a Substation Automation (SA) system. The SA system includes secondary devices, so-called Intelligent Electronic Devices (IED), responsible for protection, control and monitoring of the primary devices. The IEDs may be assigned to hierarchical levels, i.e. the station level, the bay level, and the process level. The station level of the SA system includes an Operator Work Station (OWS) with a Human-Machine Interface (HMI) and a gateway to a Network Control Centre (NCC). IEDs on the bay level, also termed bay units, in turn are connected to each other as well as to the IEDs on the station level via an inter-bay or station bus primarily serving the purpose of exchanging commands and status information. IEDs on the process-level includes sensors, or instrument transformers, for voltage (VT), current (CT) and gas density measurements, contact probes for sensing switch and transformer tap changer positions, and/or intelligent actuators (I/O) for controlling switchgear like circuit breakers or disconnectors. Exemplary process-level IEDs such as non-conventional current or voltage transformers, or dedicated Merging Units (MU) assigned to conventional sensors, include an Analog to Digital (A/D) converter for sampling of analog signals. Process-level IEDs can be connected to the bay units via a process bus replacing a known hard-wired process interface.

A communication standard for communication between the secondary devices of a substation has been introduced by the International Electrotechnical Committee (IEC) as part of the standard IEC 61850 entitled "Communication Networks and Systems In Substations". For non-time critical messages, IEC 61850-8-1 specifies the Manufacturing Message Specification (MMS, ISO/IEC 9506) protocol based on a reduced Open Systems Interconnection (OSI) protocol stack with the Transmission Control Protocol (TCP) and Internet Protocol (IP) in the transport and network layer, respectively, and Ethernet as physical media. For time-critical event-based messages, IEC 61850-8-1 specifies the Generic Object Oriented Substation Events (GOOSE) directly on the Ethernet link layer of the communication stack. For very fast periodically changing signals at the process level such as measured analogue voltages or currents IEC 61850-9-2 specifies the Sampled Measured Value (SMV) service, which, similar to GOOSE, builds directly on the Ethernet link layer. Hence, the standard defines a format to publish, as multicast messages on an industrial Ethernet, event-based messages and digitized measurement data from current or voltage sensors on the process level. SMV messages are transmitted over a process bus, which may, particularly in cost-effective medium or low voltage substations, extend to neighbouring bays, i.e. beyond the bay to which the sensor is assigned.

SA systems based on IEC 61850 are configured by means of a standardized configuration representation or formal system description called Substation Configuration Description (SCD) which is using a dedicated Substation Configuration Language (SCL). An SCD file contains the logical data flow between the IEDs on a "per data" base, for example, for every data sink/source, required/provided data sets are specified, from which a list of destination or receiver IEDs can be derived. Furthermore, the message size in terms of data set definitions, as well as the message sending rates for all periodic traffic like GOOSE and SMV is defined. The SCD file likewise specifies the distribution of multicast messages into Virtual Local Area Networks (VLANs) wherein a single IED may send different real time messages for different purposes within different VLANs of the SA communication system.

While IEC 61850 defines the way the SA devices can talk with each other, it does not define the communication architecture, for example, the way the devices are connected to each other. As one consequence of inter-operability, different architectures are nowadays technically feasible. FIG. 1 shows two examples of possible SA architecture for the same substation with two bays. The first example (top) is an architecture in which each bay includes a control IED C and two protection IEDs (e.g. main and backup) P1, P2. The second one (bottom) implements the backup protection functions for both bays onto one single IED P2 outside the bays.

The two above SA architectures may differ in a number of characteristic measures, such as performance, investment cost, maintenance cost, safety, security, and reliability. In this context, calculation of a reliability measure appears to be a highly subjective process and therefore needs to be clearly defined. Indeed, one may consider that the reliability of an SA system is the probability of having access to all, or all minus one, control devices from the station PC, while others will only consider the access to the merging units and breakers from the protection devices. Furthermore, analyzing a given complex architecture may require a reliability specialist, and/or involve a high probability of making mistakes during this process.

In this context, the principles and methods of the present disclosure are by no means restricted to a use in substation automation, but are likewise applicable to other process control systems with a standardized configuration description. In particular, it has to be noted that IEC 61850 is also an accepted standard for Hydro power plants, Wind power systems, and Distributed Energy Resources (DER) as well as for communications outside the substation (inter-substation communication for teleprotection, or substation-to-NCC communication).

The article by B. Yunus et al. entitled "Reliability and Availability Study On Substation Automation System Based on IEC 61850", IEEE 2ND INTERNATIONAL POWER AND ENERGY CONFERENCE, 1.12.2008, discloses SA system reliability study based on a hierarchical structure involving a bay level includes hardwired IEDs, a station bus and a station level. The station optical fiber ring bus accounts for a lumped communication network reliability based on eight Ethernet switches. Otherwise, parallel and serial connections of components assigned to the different levels are considered for protection or control reliability. Communication path details are not considered.

SUMMARY

An exemplary embodiment of the present disclosure provides a method of calculating a reliability of a Substation Automation (SA) system for a substation with a plurality of substation devices and substation communication elements. The exemplary method includes identifying a plurality of substation devices for performing a first SA functionality, and calculating, in a processor of a computer processing device, a reliability of the SA system based on a reliability of the identified substation devices. The exemplary method also includes identifying, from a standardized configuration representation of the SA system including logical data flow definitions of the first SA functionality, a physical data flow path and corresponding substation communication elements enabling data flow related to the first SA functionality. In addition, the exemplary method includes providing a reliability indication for each identified substation communication element, and calculating, in the processor, based on the provided reliability indications, a reliability of the identified physical data flow paths related to the first SA functionality. The exemplary method also includes calculating, in the processor, a reliability for the first SA functionality based on the reliability of the identified physical data flow paths, calculating reliabilities for further SA functionalities having identified physical data flow paths, and calculating the reliability of the SA system based on the corresponding reliabilities for the first and further SA functionalities.

An exemplary embodiment of the present disclosure provides a device for calculating a reliability of a Substation Automation (SA) system for a substation with a plurality of substation devices and substation communication elements. The exemplary device includes computing means for identifying, from a standardized configuration representation of the SA system including logical data flow definitions of a first SA functionality, a physical data flow path and corresponding substation communication elements enabling data flow related to the first SA functionality. The exemplary device also includes memory means for storing a reliability indication for each identified substation communication element. In addition, the exemplary device includes computing means for calculating, based on the reliability indications from the memory means, a reliability of the identified physical data flow paths related to the first SA functionality, and for calculating a reliability of the SA system based on the reliability of the identified physical data flow paths related to the first SA system functionality, for calculating a reliability for the first SA functionality based on the reliability of the identified physical data flow paths, for calculating reliabilities for further SA functionalities having identified physical data flow paths, and for calculating the reliability of the SA system based on the corresponding reliabilities for the first and further SA functionalities.

An exemplary embodiment of the present disclosure provides a non-transitory computer-readable recording medium having a computer program recorded thereon that causes at least one processor of a computer processing device to calculate a reliability of a Substation Automation (SA) system for a substation with a plurality of substation devices and substation communication elements. The computer program causes the at least one processor to execute operations including: identifying a plurality of substation devices for performing a first SA functionality; calculating a reliability of the SA system based on a reliability of the identified substation devices; identifying, from a standardized configuration representation of the SA system including logical data flow definitions of the first SA functionality, a physical data flow path and corresponding substation communication elements enabling data flow related to the first SA functionality; providing a reliability indication for each identified substation communication element; calculating based on the provided reliability indications, a reliability of the identified physical data flow paths related to the first SA functionality; calculating a reliability for the first SA functionality based on the reliability of the identified physical data flow paths; calculating reliabilities for further SA functionalities having identified physical data flow paths; and calculating the reliability of the SA system based on the corresponding reliabilities for the first and further SA functionalities.

BRIEF DESCRIPTION OF THE DRAWINGS

Additional refinements, advantages and features of the present disclosure are described in more detail below with reference to exemplary embodiments illustrated in the drawings, in which:

FIG. 1 shows two examples of a possible SA architecture for the same substation, according to an exemplary embodiment of the present disclosure;

FIG. 2 illustrates a single SA protection function with its data source and a sink, according to an exemplary embodiment of the present disclosure;

FIG. 5 is an excerpt of an SCL file with a formal configuration description of an IED and a switch, according to an exemplary embodiment of the present disclosure.

DETAILED DESCRIPTION

Figure 3:
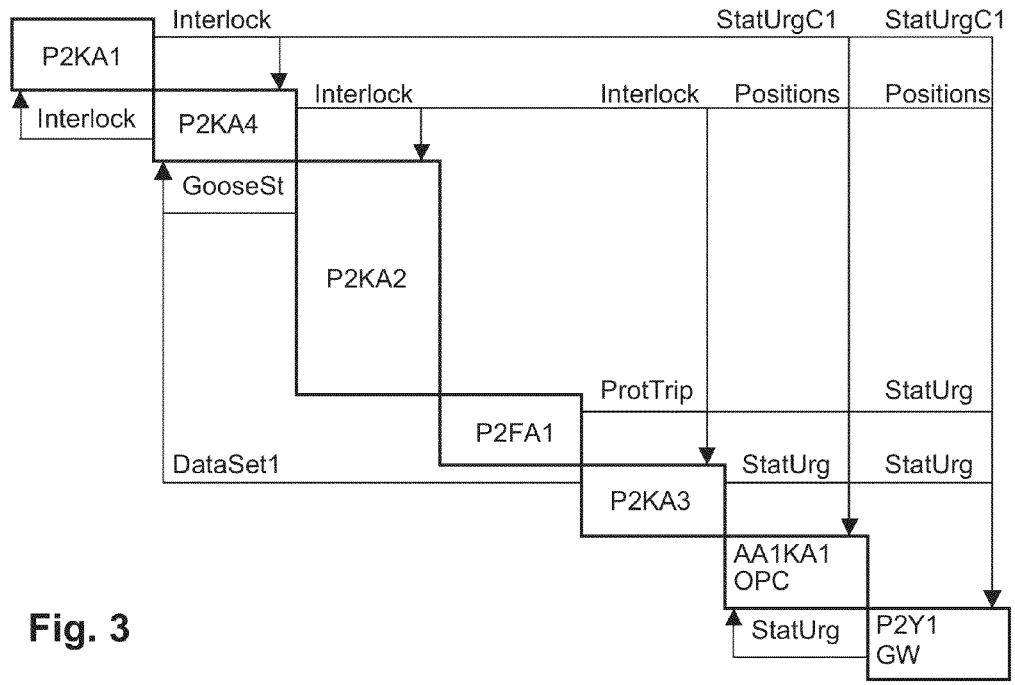
FIG. 3 is a function chart of the logical data flow between a plurality of IEDs, according to an exemplary embodiment of the present disclosure.

Exemplary embodiments of the present disclosure provide a method, device (e.g., engineering tool) and a non-transitory computer-readable recording medium (e.g., a non-volatile memory) having a computer program recorded thereon that causes a processor of a computer processing device to determine a reliability measure or index for a Substation Automation (SA) system in an objective and automated manner, allowing fair and rapid comparison of different SA systems or architectures. The method, device and processor executing the program recorded on the non-transitory computer-readable recording medium identify a plurality of substation devices for performing a first SA functionality, calculate a reliability of the SA system based on a reliability of the identified substation devices, and identify, from a standardized configuration representation of the SA system including logical data flow definitions of the first SA functionality, a physical data flow path and corresponding substation communication elements enabling data flow related to the first SA functionality. The method, device and processor executing the program recorded on the non-transitory computer-readable recording medium also provide a reliability indication for each identified substation communication element, calculate, based on the provided reliability indications, a reliability of the identified physical data flow path, and calculate, the reliability of the SA system based on the reliability of the identified physical data flow path. Additional exemplary embodiments are disclosed in more detail below with reference to the drawings.

According to an exemplary embodiment of the present disclosure, a reliability measure is calculated for an SA system with a certain SA system architecture or communication network topology. The SA system is part of an electric power transmission or distribution substation with a plurality of elements such as pieces of primary equipment and secondary Intelligent Electronic Devices (IEDs) connected to an Ethernet switch-based SA communication network, for example. For a first SA functionality to be provided by the SA system, or Logical Node (LN) in terms of IEC 61850, the substation communication elements constituting physical data flow paths between substation devices that perform the first SA functionality, and enabling, or being involved in, data exchange related to the first SA functionality, are identified. For this purpose, a standardized configuration representation of the SA system including logical data flow definitions of the first SA functionality, such as the Substation Configuration Description (SCD) according to IEC 61850, is consulted. For each identified substation communication element, a reliability indicator such as a failure probability density function characterised, for example, by a Mean Time To Failure (MTTF), a Mean Time Between Failures (MTBF), a Mean Time To Repair (MTTR), or a nominal degradation rate, is provided. Based thereupon, a reliability analysis of all the data flow paths related to the first SA functionality is performed. Finally, a reliability measure for the first SA functionality is calculated as the SA system reliability, based on the outcome of the reliability analysis and based on a reliability of the substation devices that perform the first SA functionality.

In accordance with an exemplary embodiment, reliability measures are calculated for the first as well as for further SA functionalities, and these reliability measures are consolidated into a single reliability measure of the SA system.

In accordance with an exemplary embodiment of the present disclosure, the identified data flow paths between two or more substation devices can determine a set of substation communication elements on which a fault tree based analysis is performed. This fault tree approach allows for analyzing any type of communication network including redundant and meshed architectures or topologies, whereas in a known reliability based diagram approach only serial and parallel parts of a system can be analyzed without undue efforts. A fault tree analysis considers all the physical substation communication elements such as optical fibers, switches, IEDs, or nodes in the SA communication architecture (N), and evaluates all the possible combinations of the elements working/failing ($2^N$ combinations). For each combination, it is determined whether or not the SA functionality can be provided, and a probability of the combination is calculated as a product of the working/failing probabilities of each element involved. The probabilities of those combinations for which the SA functionality can be provided are then added up to calculate an overall reliability of this SA functionality.

Accordingly, exemplary embodiments of the present disclosure automatically extract, to a maximum extent, reliability-relevant information from an SCD file describing the substation. For example, the information present in the SCD file is used to identify the physical topology of the communication network of the SA system, as well as all dataflow relating to a given SA functionality or LN. An LN reliability measure for the latter is calculated, involving reliability indications specific to each substation communication element or substation device participating in the dataflow. Finally, a number of LN reliability measures are consolidated to produce an overall reliability for the specific SA system architecture or communication network topology. Exemplary embodiments of the present disclosure therefore minimize the engineering effort required to perform a reliability calculation, and thus allow for a comparison of the reliability of different substation automation architectures with minimal effort and intervention of a reliability engineer.

For engineering purposes, reliability of an element is defined as "the probability that the element will perform its intended function during a specified period of time under stated conditions", in other words, the probability that the element will not fail before the end of the specified period of time. This may be expressed mathematically as $$R_i(t)=P\{T>t\}=\int_t^\infty f_i(x)dx$$

where $f_i(x)$ is the failure probability density function for element i and where t is the length of the period of time starting at time zero. In case of a constant failure rate $\lambda$, the reliability $R_i(t)$ of element i at time t is $$R_i(t)=e^{-\lambda*t}$$

and a Mean Time To Failure (MTTF) may be defined as $$MTTF_i=\int_0^\infty R_i(t)dt.$$

It is to be noted that reliability is a probability, and that failure is regarded as a random phenomenon. No information on individual failures, the causes of failures, or relationships between failures is stipulated, except that the likelihood for failures to occur varies over time according to a given probability function. Reliability engineering is concerned with meeting the specified probability of success, at a specified statistical confidence level. Furthermore, reliability is predicated on "intended function", which is generally taken to simply mean operation "without failure". However, even with no element of the system failing individually, the system as a whole may not or no longer do what was intended according to system requirements specification. This may be due to a spontaneous re-configuration error or a cyber attack, in which case system reliability is also impaired. Finally, units other than time may sometimes be used, and reliability may be specified in terms of miles or cycles of use.

FIG. 2 shows an example of an exemplary substation automation architecture made of a single SA protection function or Logical Node (LN) being run on an Intelligent Electronic Device (IED). The protection function needs data produced by current transformer CT1 as a data source and needs access to circuit breaker XCBR1 as a data sink. The current transformer and circuit breaker are connected, via lines cw1 and cw2, to a merging unit MU1. Two Ethernet switches S1, S2 link in a redundant manner and via communication network elements or sections fo1, fo1, fo3, fo4 the IED and the merging unit. The two redundant paths may be distinct and even involve, for example, a tree and a ring structure. The reliability of the protection function being run on IED1 can be evaluated in different ways. For example, analytical analysis can be expressed by the classical equation:

$$R_s=R_{ct1}*R_{xcbr1}*R_{cw1}*R_{cw2}*R_{ied1}*R_{mu1}*(1-(1-R_{s1}*R_{fo1}*R_{fo3})*(1-R_{s2}*R_{fo2}*R_{fo4})).$$

Here, $R_s$ is the reliability of the "system" composed of the single protection function, and $R_x$ is the reliability of element x, e.g. $R_{xcbr1}$ is the "hardware" reliability of the real breaker.

For a more elaborate or realistic SA system and following a structured and systematic approach, calculating the reliability requires knowledge of all the elementary SA functions being implemented, their respective data source(s) and data sink(s), the physical device on which each given SA function is executed, and the physical communication paths between the data source and the physical device, as well as between the latter and the data sink. In addition, an identification of a mean time to failure or other reliability indicator for each individual element along the above-identified communication paths is needed as well. Such a reliability indication may be gained on past experience with the same, or at least with a similar, kind of element, and ideally takes also into account vulnerability against reconfiguration errors and cyber attacks. Exemplary values for the MTTF may range between 50 years for a switch or IED, and 300 years for a piece of optical fibre, or even 500 years for copper wire.

An exemplary embodiment of the present disclosure takes advantage of the fact that the Substation Configuration Description SCD files in IEC 61850 notations describe the SA system in a formal and standardized way. All the information required for the reliability calculation can be directly extracted from the SCL file and therefore minimizing the engineering effort:

1. Identification of the Logical Nodes (LN) representing the basic SA functionality, as well as the Logical Devices to which the LNs are grouped or assigned. This is specified in the DataTypeTemplates section and the IED section(s) of the SCD file. The DataTypeTemplates section allows for identification the different LN present on the system, whereas the IED section allows for identification of the logical devices.

2. Identification of logical dependencies for each LN or logical device. The IED section identifies through the Inputs subsection the input data required by the LN from a source, while the DataSet subsection identifies the output data produced/modified by the LN on behalf of a data sink. By matching the different Inputs and DataSet subsections, it is therefore possible to determine the dependencies between the logical devices acting as data sources and data sinks. Even though it is possible to identify the different logical inputs and outputs of a logical device, it is not possible to determine if the inputs (or outputs) are implemented in a redundant manner or not. The redundant data in the case of a redundant communication link will need to be specified manually.

3. Identification of physical devices (IEDs) present in the SA system. The communication section identifies the different Connected Access Points. Then, the IED section maps the Connected Access Point and physical devices.

4. Identification of the logical link between a LN and the hosting physical device—The LDevice subsection of the IED section identifies the different Logical Nodes. Since a Logical Device subsection belongs to a IED section, the mapping of the different logical devices to the physical devices (e.g. IED) can be known.

5. Identification of physical links—The PhysConn subsection of the Communication section of a valid and complete SCD file lists the different links used in the substation automation as well as the ports of physical devices they are connected to. This step produces the communication architecture or topology of the SA system.

Finally, a mean time to failure and mean time to repair of each individual element as discussed above is required. This information is missing in the SCD file and an extension has to be made. Different ways are possible for doing it. As an example, the private section of the SCD file can be used to store the reliability of each element of the substation, or an external memory or storage means, distinct from the SCD file, can play this role so the reliability figures remain confidential.

Figure 4:
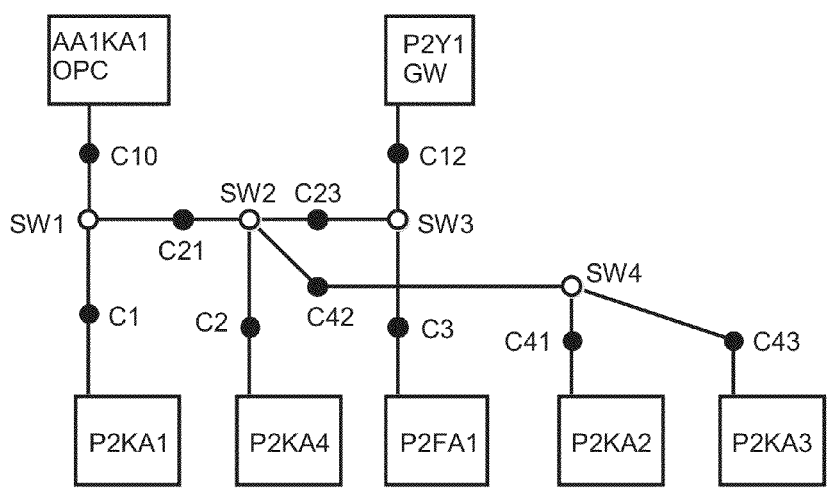
FIG. 4 depicts the physical network structure of a communication network, according to an exemplary embodiment of the present disclosure.

FIGS. 3 to 5 illustrate the fact that the information required for steps 1 to 5 above is readily available from a standardised configuration description, e.g. the SCL file according to IEC 61850, of the SA system.

For example, FIG. 3 is a function chart showing the configured communication or logical data flow between Intelligent Electronic Devices (IEDs) of an exemplary Substation Automation (SA) system. The data flow includes unbuffered reports (e.g., "position" from IED P2KA4 to Gateway P2Y1 and OPC server AA1KA1) and GOOSE messages (e.g. "interlock" from IED P2KA4 to IEDs P2KA3, P2KA1, P2KA2).

FIG. 4 depicts an exemplary physical network structure of the communication network of the SA system of FIG. 3. Shown are switches (open circles), cables (dots), and IEDs (rectangles). The switches SW1, SW2, SW3, SW4 are connected to the IEDs with cables C1, C2, C3, C41, C43, C10, C12, and among themselves with trunk cables C21, C23, C42.

FIG. 5 depicts an excerpt of a Substation Configuration Language (SCL) file, specifically concerned with IED "P2KA1" and switch "SW1" of the SA communication system introduced in FIG. 3. The parts of the SCL file reproduced in FIG. 5 define for GOOSE "interlock" messages a Virtual Local Area Network (VLAN) identifier ("VLAN-ID" 004) and sending frequency (MinTime, MaxTime). Furthermore, an exemplary description of physical network structure in the standardized configuration representation according to IEC 61850 includes a reference to the cable "C1" interconnecting port "P1" of the IED and port "P5" of the switch, c.f. FIG. 4.

The above-described features of the present disclosure can be implemented by one or more processors of a computer-processing device (e.g., a general purpose computer) executing a computer program recorded on a non-transitory computer-readable recording medium, such as a hard disk drive, ROM, flash memory, optical memory, or any other type of non-volatile memory. The one or more processors may constitute computing means as described herein, and the computing means may operate in conjunction with such a computer-readable recording medium (e.g., memory means) to store a reliability indication for each identified substation communication element, as well as additional functions as described herein.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of calculating a reliability of a Substation Automation (SA) system for a substation with a plurality of substation devices and substation communication elements, the method comprising:
   identifying a plurality of substation devices for performing a first SA functionality;
   calculating, in a processor of a computer processing device, a reliability of the SA system based on a reliability of the identified substation devices;
   identifying, from a standardized configuration representation of the SA system including logical data flow definitions of the first SA functionality, a physical data flow path and corresponding substation communication elements enabling data flow related to the first SA functionality;
   providing a reliability indication for each identified substation communication element;

calculating, in the processor, based on the provided reliability indications, a reliability of the identified physical data flow paths related to the first SA functionality;

calculating, in the processor, a reliability for the first SA functionality based on the reliability of the identified physical data flow paths;

calculating reliabilities for further SA functionalities having identified physical data flow paths; and calculating the reliability of the SA system based on the corresponding reliabilities for the first and further SA functionalities.

2. The method of claim 1, comprising:
analyzing the physical data flow paths based on fault trees.

3. The method of claim 1, comprising:
providing the reliability indication for each identified substation communication element from a memory external to the standardized configuration representation of the SA system.

4. The method of claim 1, comprising:
manually specifying any redundant data flow between the elements.

5. The method of claim 1, comprising:
calculating an SA reliability for each of a plurality of distinct SA system architectures for the substation, and comparing the plurality of calculated SA reliabilities.

6. A device for calculating a reliability of a Substation Automation (SA) system for a substation with a plurality of substation devices and substation communication elements, comprising:

computing means for identifying, from a standardized configuration representation of the SA system including logical data flow definitions of a first SA functionality, a physical data flow path and corresponding substation communication elements enabling data flow related to the first SA functionality;

memory means for storing a reliability indication for each identified substation communication element; and computing means for calculating, based on the reliability indications from the memory means, a reliability of the identified physical data flow paths related to the first SA functionality, and for calculating a reliability of the SA system based on the reliability of the identified physical data flow paths related to the first SA system functionality, for calculating a reliability for the first SA functionality based on the reliability of the identified physical data flow paths, for calculating reliabilities for further SA functionalities having identified physical data flow paths, and for calculating the reliability of the SA system based on the corresponding reliabilities for the first and further SA functionalities.

7. A non-transitory computer-readable recording medium having a computer program recorded thereon that causes at least one processor of a computer processing device to calculate a reliability of a Substation Automation (SA) system for a substation with a plurality of substation devices and substation communication elements, the computer program causing the at least one processor to execute operations comprising:

identifying a plurality of substation devices for performing a first SA functionality;

calculating a reliability of the SA system based on a reliability of the identified substation devices;

identifying, from a standardized configuration representation of the SA system including logical data flow definitions of the first SA functionality, a physical data flow path and corresponding substation communication elements enabling data flow related to the first SA functionality;

providing a reliability indication for each identified substation communication element;

calculating based on the provided reliability indications, a reliability of the identified physical data flow paths related to the first SA functionality;

calculating a reliability for the first SA functionality based on the reliability of the identified physical data flow paths;

calculating reliabilities for further SA functionalities having identified physical data flow paths; and calculating the reliability of the SA system based on the corresponding reliabilities for the first and further SA functionalities.

8. The non-transitory computer-readable recording medium of claim 7, wherein the computer program causes the at least one processor to execute operations comprising:
analyzing the physical data flow paths based on fault trees.

9. The non-transitory computer-readable recording medium of claim 7, wherein the computer program causes the at least one processor to execute operations comprising:
providing the reliability indication for each identified substation communication element from a memory external to the standardized configuration representation of the SA system.

10. The non-transitory computer-readable recording medium of claim 7, wherein the computer program causes the at least one processor to execute operations comprising:
manually specifying any redundant data flow between the elements.

11. The non-transitory computer-readable recording medium of claim 7, wherein the computer program causes the at least one processor to execute operations comprising:
calculating an SA reliability for each of a plurality of distinct SA system architectures for the substation, and comparing the plurality of calculated SA reliabilities.

* * * * *